(12) United States Patent
Steer

(10) Patent No.: US 12,496,150 B2
(45) Date of Patent: Dec. 16, 2025

(54) RFID SHIELD

(71) Applicant: CMR Surgical Limited, Cambridge (GB)

(72) Inventor: William Andrew Steer, Cambridge (GB)

(73) Assignee: CMR Surgical Limited, Cambridge (GB)

( * ) Notice: Subject to any disclaimer, the term of this patent is extended or adjusted under 35 U.S.C. 154(b) by 377 days.

(21) Appl. No.: 18/258,976

(22) PCT Filed: Jan. 12, 2022

(86) PCT No.: PCT/GB2022/050059
§ 371 (c)(1),
(2) Date: Jun. 22, 2023

(87) PCT Pub. No.: WO2022/153044
PCT Pub. Date: Jul. 21, 2022

(65) Prior Publication Data
US 2024/0041541 A1    Feb. 8, 2024

(30) Foreign Application Priority Data
Jan. 15, 2021 (GB) ..................... 2100515

(51) Int. Cl.
*A61B 34/30*     (2016.01)
*A61B 90/98*     (2016.01)
(Continued)

(52) U.S. Cl.
CPC .............. *A61B 34/30* (2016.02); *A61B 90/98* (2016.02); *A61B 2017/00221* (2013.01);
(Continued)

(58) Field of Classification Search
CPC ........... A61B 2017/00221; A61B 2017/00477; A61B 2090/0436; A61B 2090/0481; A61B 2562/182; A61B 34/30; A61B 90/98
See application file for complete search history.

(56) References Cited

U.S. PATENT DOCUMENTS

| | | | |
|---|---|---|---|
| 5,521,351 A | 5/1996 | Mahoney | |
| 2010/0042097 A1 | 2/2010 | Newton et al. | |

(Continued)

FOREIGN PATENT DOCUMENTS

| | | | |
|---|---|---|---|
| JP | 2005150590 A | 6/2005 | |
| JP | 2019524190 A | 9/2019 | |

OTHER PUBLICATIONS

Notification of Reasons for Refusal for Japanese Patent Application No. 2023-541937, drafted May 8, 2024.
(Continued)

*Primary Examiner* — Scott Luan
(74) *Attorney, Agent, or Firm* — Andrus Intellectual Property Law, LLP

(57) ABSTRACT

A robotic surgical arm including a receiver configured to receive wireless communications from a robotic surgical instrument attached to the robotic surgical arm and a shield including a plurality of fingers each having a common shape and a connector being in contact with each of the fingers. When the connector is electrically connected to ground, the shape, dimensions and arrangement of the fingers causes attenuation of the transmission of electric fields through the shield.

20 Claims, 12 Drawing Sheets

(51) Int. Cl.
*A61B 17/00* (2006.01)
*A61B 90/00* (2016.01)
(52) U.S. Cl.
CPC ............... *A61B 2017/00477* (2013.01); *A61B 2090/0436* (2016.02); *A61B 2090/0481* (2016.02)

(56) References Cited

U.S. PATENT DOCUMENTS

2014/0309491 A1   10/2014   Karasawa
2017/0020617 A1   1/2017    Weir et al.

OTHER PUBLICATIONS

International Search Report and Written Opinion for International Patent Application No. PCT/GB2022/050059, mailed Apr. 12, 2022.
Search Report Under Section 17(5) for UK Patent Application No. GB2100515.2, mailed Oct. 18, 2021.

RFID SHIELD

CROSS-REFERENCE TO RELATED APPLICATIONS

This application is the U.S. national stage application of International Application PCT/GB2022/050059, filed Jan. 12, 2022, which international application was published on Jul. 21, 2022, as International Publication WO 2022/153044 A1 in the English language. The international application is incorporated herein by reference, in entirety. The international application claims priority to GB Patent Application No. 2100515.2, filed Jan. 15, 2021, which is incorporated herein by reference in its entirety.

BACKGROUND

It is known to use robots for assisting and performing surgery. FIGS. 1 and 2 show a typical surgical robot 100 which comprises a base 101, an arm 102 and an instrument 105. The base supports the robot, and is itself attached rigidly to, for example, the operating theatre floor, the operating theatre ceiling or a trolley. The arm 102 extends between the base and the instrument. The arm is articulated by means of multiple flexible joints 103 along its length, which are used to position the surgical instrument 105 in a desired location relative to the patient. The surgical instrument is attached to the distal end of the robot arm. The surgical instrument penetrates the body of a patient at a port so as to access the surgical site.

A typical surgical instrument 105 shown in FIG. 3 comprises an instrument interface 301 by means of which the surgical instrument connects to the robot arm 102. A shaft 302 extends between the instrument interface 301 and an articulation 303. The articulation terminates in an end effector 106 and permits the end effector to move relative to the shaft 302.

In surgical robotics it is known to transmit information from a surgical instrument to a surgical robotic arm when the instrument is attached to the arm. Communication signals sent between the instrument and arm commonly include information about the identity of the instrument, the type of instrument, the lifetime of the instrument and the number of uses of the instrument, among other things. Surgical robotic systems of the prior art commonly use wired connections between the surgical robotic arm and any instrument attached to the arm to enable communication signals to be sent between the instrument and the arm. In such a system, suitable wiring is incorporated into the interface between the arm and instrument. The interface therefore facilitates transmission of wired communication as well as transmission of drive from the arm to the instrument for actuating the instrument. To design an interface fulfilling both of these functions is not trivial due to the additional requirement that the interface must also maintain a sterile barrier to the surgical field. For example, the interface may also be required to secure a drape between the arm and the instrument such that the instrument is located in the sterile zone but the arm (inside the drape) is not.

It is therefore desirable to devise a surgical robotic system capable of wirelessly transmitting information from a surgical robotic arm to a surgical instrument.

SUMMARY OF THE INVENTION

According to the first embodiment of the invention there is provided a robotic surgical arm as set out in the accompanying claims.

According to the second embodiment of the invention there is provided a robotic surgical instrument as set out in the accompanying claims.

In particular, there is provided a robotic surgical arm comprising: an interface configured to engage a robotic surgical instrument; a receiver configured to receive wireless communications from the robotic surgical instrument; and a shield comprising: a plurality of fingers; and a connector being in contact with each of the fingers, wherein the shield is configured so that when the connector is electrically connected to ground, the shape, dimensions and arrangement of the fingers causes attenuation of the transmission of electric fields through the shield.

The shield may be positioned so as to be between the robotic surgical instrument and the receiver when the robotic surgical instrument is engaged with the interface.

The shield may be positioned on the interface.

The arm may comprise an air space between the fingers of the shield and the receiver, wherein the length of the air space is equal to the perpendicular distance between the fingers of the shield and the receiver.

The plane of the shield may be the cross section of the shield in a direction perpendicular to the perpendicular distance between the fingers of the shield and the receiver.

The shield may further comprise a foam element adhered to the fingers of the shield, the foam element having a length in the direction perpendicular to the plane of the shield equal to the length of the air space, the foam element positioned so as to occupy the air space between the fingers and the receiver.

The shield may be planar.

The area of the shield may be the area of the plane of the shield and the area of the shield may be greater than the area of the receiver in a parallel plane.

The perpendicular distance between the fingers of the shield and the receiver may be greater than the perpendicular distance between each pair of adjacent fingers in the shield.

The connector may be electrically connected to the local ground of the receiver.

There is provided a robotic surgical instrument comprising: an instrument interface configured to engage a robotic surgical arm; a transmitter configured to transmit wireless communications to a receiver of the robotic surgical arm; and a shield comprising: a plurality of fingers; and a connector being in contact with each of the fingers, wherein the shield is configured so that when the connector is electrically connected to ground, the shape, dimensions and arrangement of the fingers causes attenuation of the transmission of electric fields through the shield.

The shield may be positioned so as to be between a shaft of the robotic surgical instrument and the receiver of the robotic surgical arm when the robotic surgical arm is engaged with the interface.

The shield may be positioned on the instrument interface.

Each finger might not form a closed loop with itself, with any other finger or with the connector.

The fingers and the connector may be composed of non-ferrous materials.

The shield may be configured to permit transmission of radio frequency signals through the shield.

The shield may be configured to permit transmission of magnetic fields through the shield.

The fingers may have a common shape and may be arranged in a row, each finger may be parallel to each of the other fingers in the row and for each finger, the sum of the width of the finger and the perpendicular distance between the finger and an adjacent finger may be less than 4 millimetres.

The ratio of the width of each finger to the perpendicular distance between each pair of adjacent fingers may be between 60:40 and 20:80.

Each finger may extend in a first direction and the connector may extend in a second direction perpendicular to the first direction.

Each finger may have a first end and a second end and the connector may make contact with each finger at its first end.

Each finger may have a first end and a second end and the connector may make contact with each finger at a point along the finger between the first and second ends.

The shield may comprise a first and a second row of fingers and first, second and third connectors, wherein the first connector may make contact with each finger in the first row of fingers, the second connector may make contact with each finger in the second row of fingers and the third connector may make contact with the first connector and the second connector.

Each finger may have the configuration of a partial circle having a radius, wherein the radius of the partial circle formed by each finger may be different to the radius of the partial circle formed by every other finger, and the fingers may be arranged concentrically with respect to one another.

Each finger may have a zig zag shape.

Each finger may have a straight configuration, the connector may have a straight configuration, and each finger may be arranged radially with respect to the other fingers and with respect to the connector.

The fingers may be arranged radially and wherein, for each finger, the sum of the width of the finger and the smallest distance between the finger and an adjacent finger may be less than 4 millimetres wherein the perpendicular distance between the fingers and the receiver may be greater than the smallest distance between each pair of adjacent fingers in the shield.

The connector may have the configuration of a partial circle and may contact each finger so as to partially surround the plurality of fingers.

DETAILED DESCRIPTION

Figure 1:
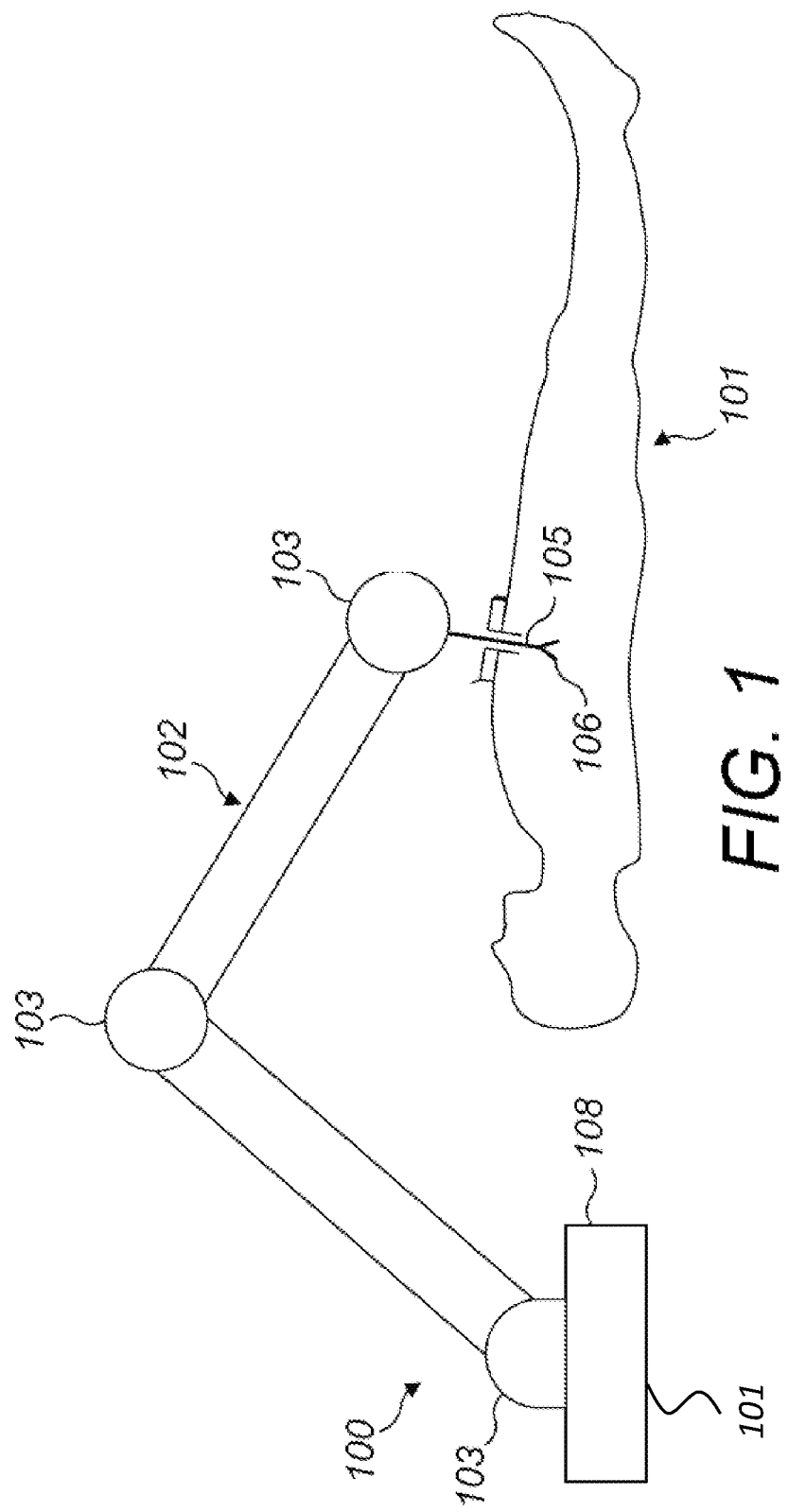
FIG. 1 shows a surgical robot and a patient.
Figure 2:
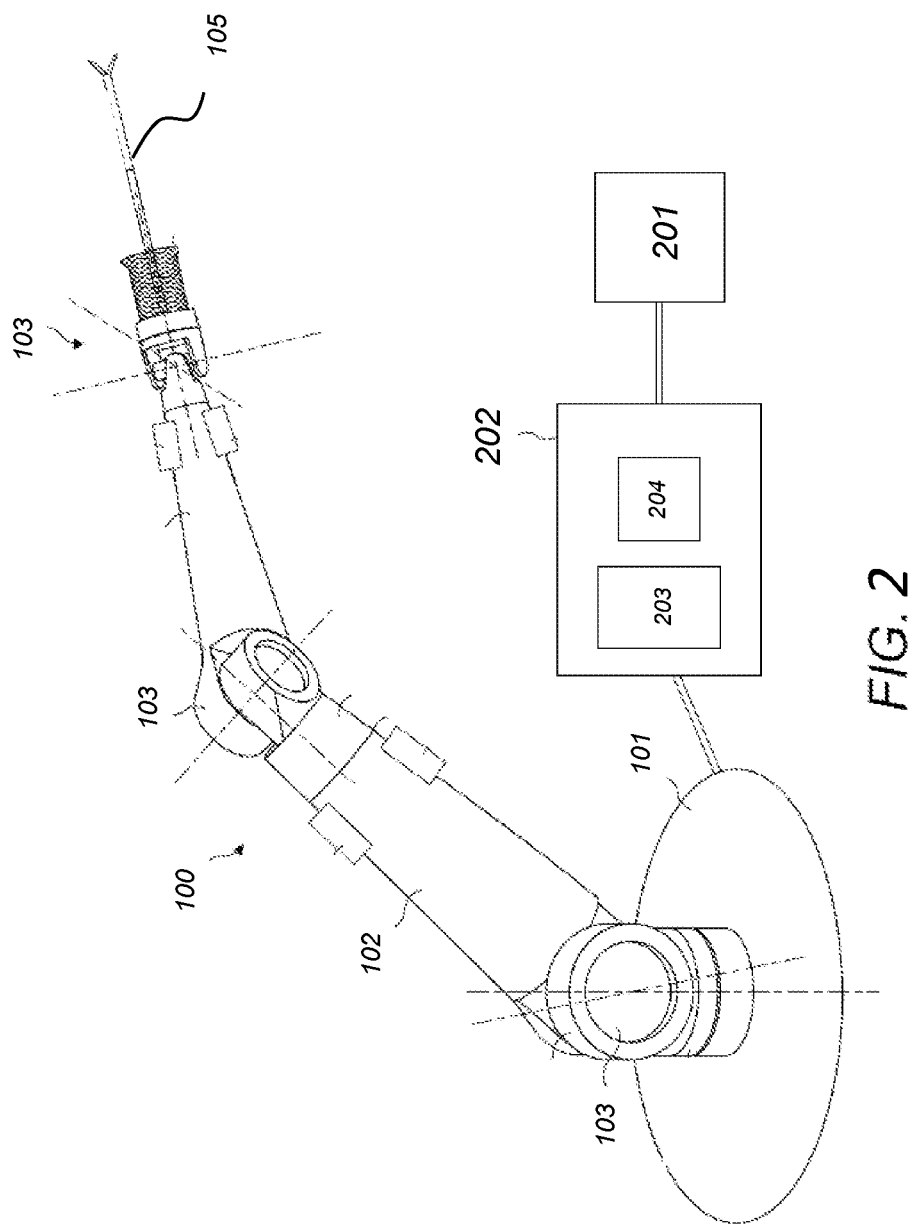
FIG. 2 shows a surgical robot and associated control system.
Figure 3:
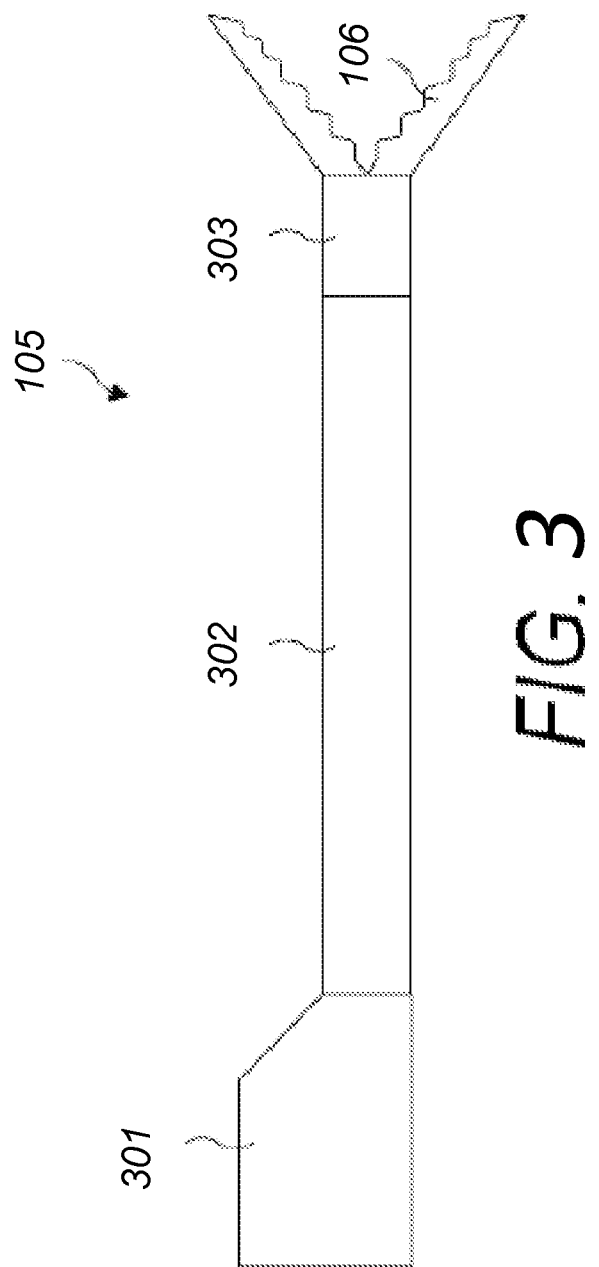
FIG. 3 shows an instrument.

The surgical robotic system described herein can be controlled so as to perform a desired surgical procedure. As seen in FIG. 2, the surgical robot 100 forms part of a system also including a surgeon command interface 201 and a control unit 202. The control unit comprises a processor 203 and a memory 204. The memory 204 stores in a non-transient way software that is executable by the processor to control the operation of the motors to cause the arm 102 to operate in the way described. The software can control the processor 203 to cause the motors to drive in dependence on inputs from the surgeon command interface. The control unit 202 is coupled to the motors for driving them in accordance with outputs generated by execution of the software. The surgeon command interface 201 comprises one or more input devices whereby a user can request motion of the end effector in a desired way. The input devices could, for example, be manually operable mechanical input devices such as control handles or joysticks, or contactless input devices such as optical gesture sensors. The software stored in memory 204 is configured to respond to those inputs and the processor is configured to execute the software to cause the joints of the arm and instrument to move accordingly. In summary, a surgeon at the command interface 201 can control the instrument 105 to move in such a way as to perform a desired surgical procedure. The control unit 202 and/or the command interface 201 may be remote from the arm 102.

Figure 4:
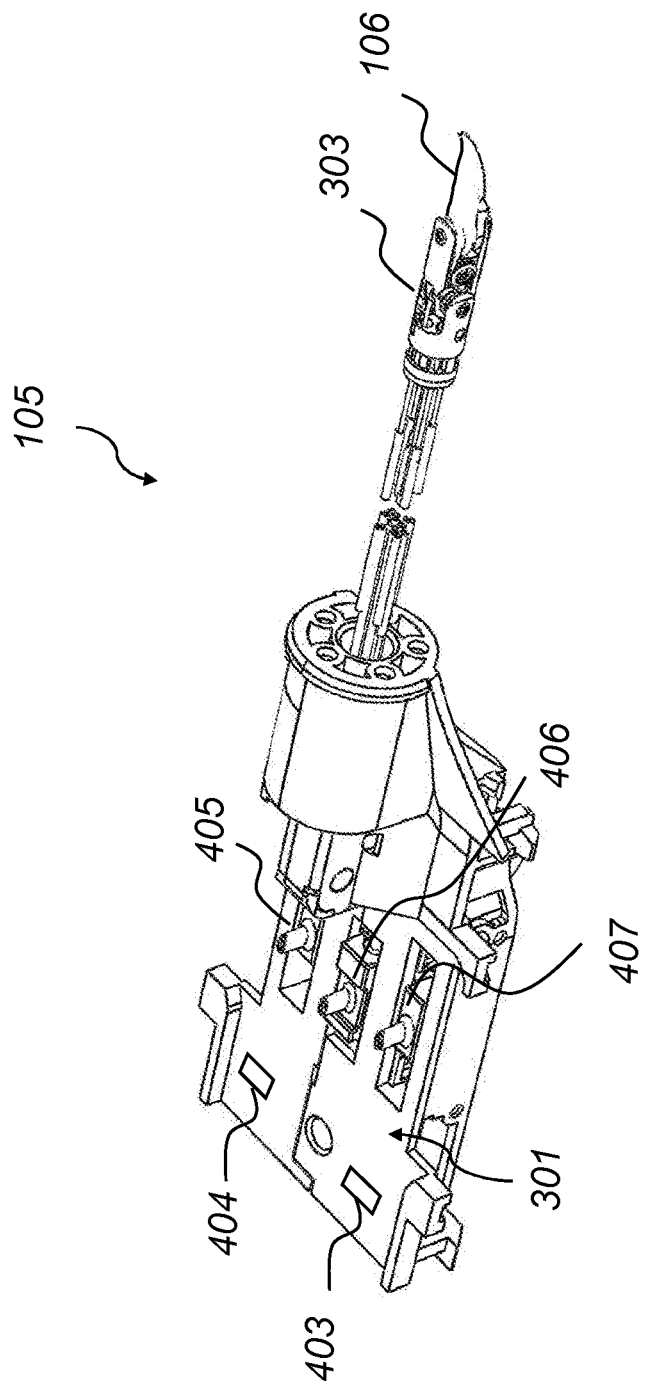
FIG. 4 shows an instrument in more detail

The presently described surgical robotic system wirelessly transmits communication signals between the instrument and the arm. A surgical instrument 105 having an instrument interface 301 is shown in FIG. 4. The instrument interface comprises instrument interface elements 405, 406 and 407. Driving elements connect the instrument interface elements 405, 406, 407 to articulation 303 to control motion of the end effector 106. When the instrument is attached to the robot arm, the instrument interface elements engage with respective drive assembly interface elements on the robot arm so that drive can be transferred from the robot arm to the instrument.

The instrument comprises a memory 404 configured to store information about the instrument. The information may include any one or combination of: the identity of the instrument (instrument ID), the type of instrument, the lifetime of the instrument and the number of uses of the instrument. The instrument 105 further comprises a transmitter 403 configured to transmit the stored information to a surgical robotic arm 102 when the instrument is attached to the arm. The transmitter may be a transceiver configured to send and receive information using wireless communications. The arm may send information to be received at the instrument and written to the instrument memory, for example the number of uses of the instrument. In the example shown in FIG. 4, both the memory 404 and transmitter 403 are positioned on the instrument interface 301. In other examples, the memory and/or transmitter may be located elsewhere on the instrument. FIG. 4 shows an example of a surgical instrument in which the end effector 106 of the instrument 105 is a pair of graspers. However in other examples the instrument may comprise any other type of end effector such as smooth jaws, serrated jaws, a pair of shears, a needle for suturing, a camera, a laser, a knife, a stapler or a suctioner. The instrument may also be an electrosurgical instrument, such as a cauteriser or monopolar scissors, as explained in more detail below.

Figure 5:
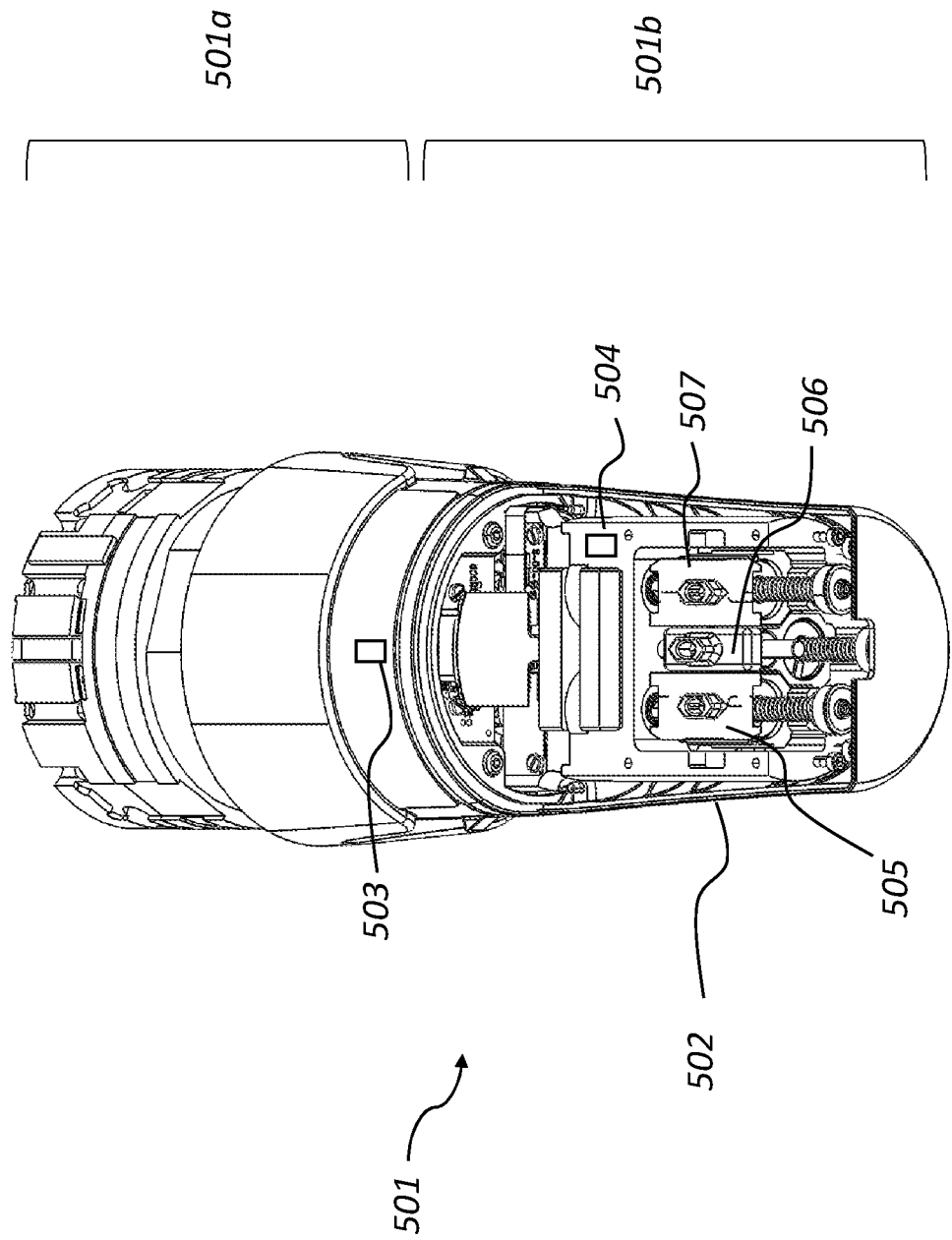
FIG. 5 shows a portion of a surgical robotic arm comprising an interface for attaching to a surgical instrument.

FIG. 5 shows a portion 501 of robot arm 102 configured to receive instrument 105. The arm 102 comprises a number of links, wherein portion 501 is the terminal link of the arm. The portion of the robot arm shown comprises part of the main body of the arm 501a and a drive assembly 501b. The main body of the arm extends between the drive assembly and the base of the arm. The drive assembly comprises drive assembly interface 502 which interfaces with the instrument interface 301 of instrument 105. The surgical robot arm 102 comprises a receiver 503 configured to receive information transmitted from an instrument when it is attached to the arm. In examples, in which information is also sent from the arm to the instrument, the receiver may be a transceiver configured to send and receive information. This application primarily refers to transmission of signals from an instrument transmitter to an arm receiver, but the principles described apply equally to examples in which both the arm and instrument include transceivers and wireless signals are also sent from the arm to the instrument.

In the example seen in FIG. 5, the receiver 503 is positioned in the main body of the arm 501a. The arm also comprises a memory 504 configured to store the information received from the instrument. In the example shown in FIG. 5, the memory 504 is located on the drive assembly interface 502, but in other examples, the memory may be located elsewhere on the arm. In the described examples, the transmitter 403 on the instrument 103 transmits radio frequency wireless communication signals to send information to the receiver 503 on the robot arm. Sending radio frequency wireless signals involves creating a magnetic field at the transmitter which reaches the receiver and induces a current in receiver. In other examples, different types of wireless communications protocols may be used.

The drive assembly of the robot arm drives articulation of the instrument when the instrument is attached to the arm. The drive assembly interface 502 engages with the interface 301 of the instrument. Moveable interface elements 505, 506, 507 of the drive assembly interface engage corresponding moveable interface elements of the instrument interface 405, 406, 407 in order to transfer drive from the robot arm 102 to the instrument 105.

In robotic surgery, it is common to use more than one surgical instrument. Each instrument may be attached to a different robot arm. In other examples, more than one instrument may be attached to a single robotic arm. For example, the robotic arm may comprise a number of drive assembly interfaces each with a respective instrument attached. Each instrument comprises a transmitter configured to transmit radio frequency wireless communications (RFID) to the arm. The RFID wireless signals include information about the specific instrument, for example the identity of the instrument, the type of instrument, the lifetime of the instrument and the number of uses of the instrument. Instruments which can be attached to the surgical robotic arm include electrosurgical instruments which use a high frequency electrical current to perform surgical operations.

Electrosurgical instruments can include electrosurgical monopolar scissors comprising an electrode probe which is supplied with an electrical current and used to cut tissue during a surgical procedure on a patient. The shaft of the monopolar scissors is electrically energised during operation. It is useful for the robot arm to "know", for example, what type of instrument is attached to which drive assembly interface of the robot arm. This is particularly important for electrosurgical instruments as the operation of such an instrument may be more complex due to the need to energise the instrument shaft.

When a current is passed through the instrument and the instrument becomes live, an electric field is created in the instrument. The instrument may become capacitively coupled to the receiver on the arm. Capacitive coupling refers to a phenomenon where, in this example, when the energised instrument is positioned close to, but not in contact with, the receiver, an electrical current is established in the receiver. When the live instrument becomes coupled to the receiver, the receiver may become capacitively charged and enter a stuck state. When this happens, the instrument may not be recognised by the receiver on the arm. The instrument may therefore become inoperable, and the robotic surgical arm may require a restart.

In situations where multiple instruments attached to multiple robot arms are used alongside one another or multiple instruments are attached to the same surgical robot arm, non-energised instruments may be used alongside energised instruments. Non-energised instruments may include for example graspers and scissors. In situations where an energised electrosurgical instrument is positioned in close proximity to a non-energised instrument, it has been found that capacitive coupling can occur between the two instruments. A current may therefore be established in the non-energised instrument.

The exact nature of the current established depends on the proximity of the two instruments as well as on the voltage of the electric supply being supplied to the electrosurgical instrument, the permittivity of the medium between the instruments and the degree of insulation of both instruments. The permittivity of a medium may change with environmental conditions, such as humidity. When an electric current is induced in a traditional (non-energised) instrument by capacitive coupling, just as described above with respect to the electrosurgical instrument, the non-energised instrument may become capacitively coupled to the receiver on the arm, resulting in problems with the receiver recognising the information being received, as described above.

It is therefore desirable to reduce capacitive coupling occurring between a surgical instrument and the receiver on the robot arm receiving radio frequency signals transmitted from the instrument. It has been found that in order to transmit information from a surgical instrument to a robot arm (or vice versa) wirelessly without incurring capacitive coupling between the instrument and receiver on the arm, it is effective to place a shield between the instrument (the electrosurgical instrument or the non-electrosurgical instrument when a current is induced in it due to capacitive coupling) and the radio frequency signal receiver on the arm. The shield can be placed anywhere between the instrument and the receiver. The shield is configured to draw charge away from the instrument. In other words, the shield acts as an electrical sink for the electric field formed in the instrument. For example, the shield is positioned such that capacitive coupling occurs between the instrument and the shield and not between the instrument and the receiver. The shield therefore reduces passage of the electric field originating from the instrument through the shield. The shield causes significant attenuation of the electric field originating from the instrument. The example shields described in this application generally have planar configurations and through the shield is taken to mean from one side of the shield's plane to the other. In other examples, where the shield may be three-dimensional, the plane of the shield is taken to mean the longitudinal cross section of the shield and through the shield is taken to mean from one side of that plane to the other.

Figure 6:
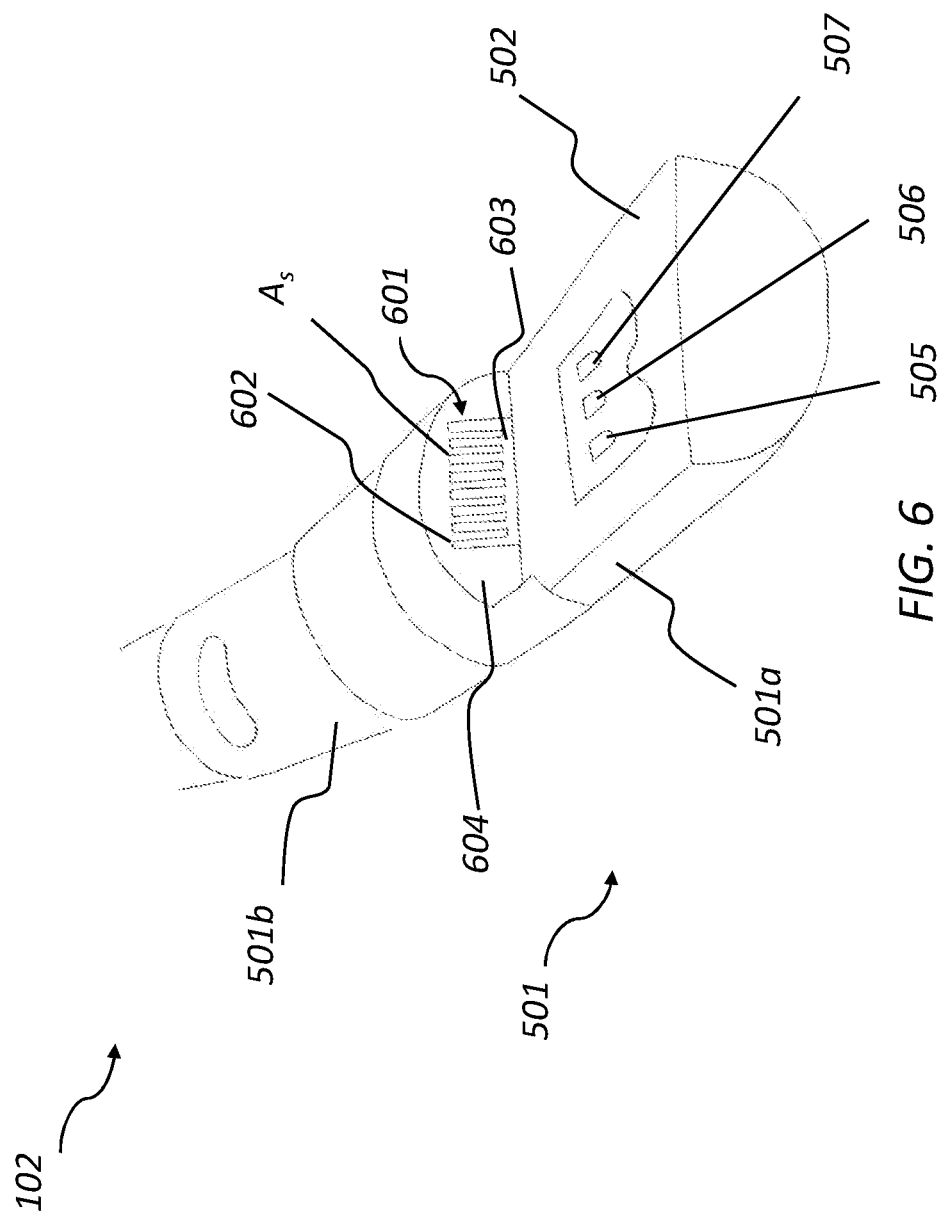
FIG. 6 shows a portion of a robot arm comprising a shield

FIG. 6 illustrates an example of a robot arm comprising a shield. FIG. 6 shows the terminal link of the arm as well as other links of the arm. Shield 601 seen in FIG. 6 comprises a plurality of fingers 602 and a connector 603 joining the plurality of fingers. In this example, the shield comprises eight fingers, but in other examples the shield could comprise any number of fingers greater than four.

Fingers 602 have straight configurations and are arranged in a row. Connector 603 extends in a direction perpendicular to each of the fingers in the row. The shield 601 is connected to ground. Specifically, connector 603 of the shield is connected to ground such that the shield 601 is not charged. In the example shown in FIG. 6, the connector 603 is connected to the local ground of the receiver 503 (not shown).

As described above, an electric field may be created in the shaft of an electro-surgical or traditional instrument. If the electric field is allowed to reach the receiver 503, capacitive coupling between the instrument and the receiver can occur, which can cause problems with the receiver's ability to receive RFID signals from a transmitter on the instrument. The shield is positioned between the instrument and the receiver and functions to attenuate the electric field before it reaches the receiver. The electric field from the instrument capacitively charges the fingers of the shield so that small currents are created in the fingers 602 of the shield. Small magnetic fields may therefore also be induced in the fingers of the shield. As each finger is connected to connector 603, which is connected to ground, the charges in each finger are dissipated to ground by the shield. The shield therefore draws charge away from the instrument and dissipates that charge, thereby preventing the instrument's electric field from reaching the receiver. In this way, capacitive coupling between the instrument and the receiver is reduced. Any magnetic fields which may be induced in the shield are also reduced by dissipating any charges formed in the fingers of the shield to ground. As will be explained in more detail below, the exact structure and dimensions of the shield allow magnetic fields (which are generated for sending RFID signals) to pass through the shield, but cause attenuation of electric fields, such as those created in instrument shafts. The magnetic field originating from the RFID transmitter on the instrument is unaffected by the shield and is able to reach the receiver. This magnetic field may cause small currents to be induced in the shield, but these currents are also dissipated to ground by the shield.

Figure 8:
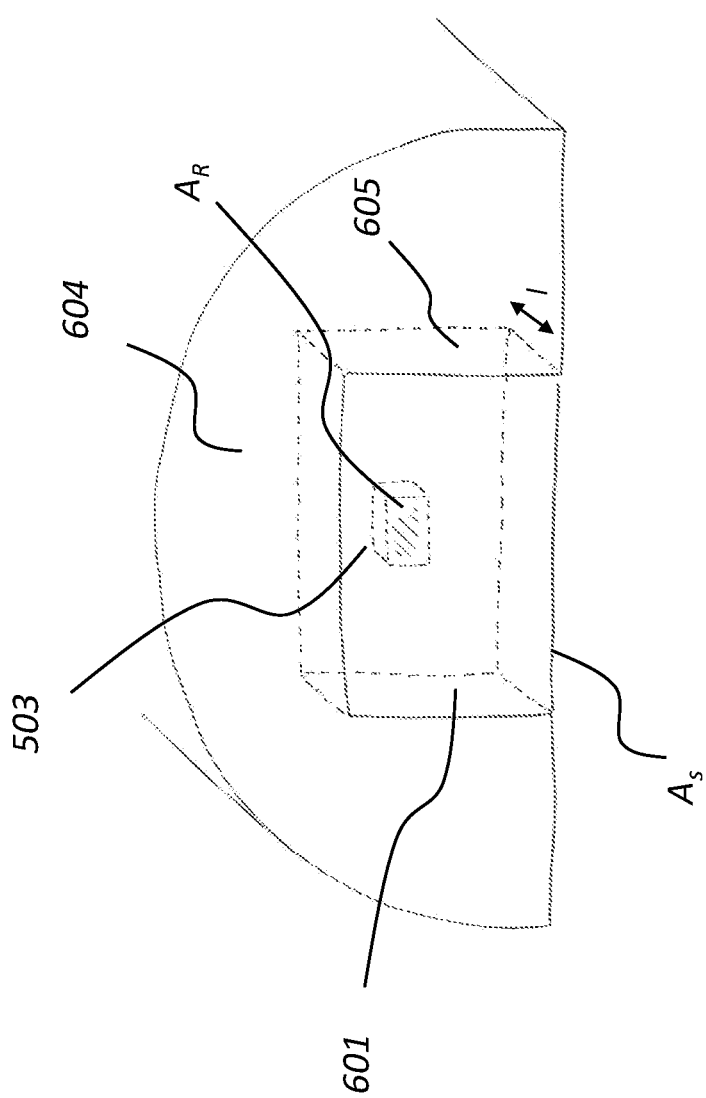
FIG. 8 shows a more detailed view of a portion of a robot arm comprising a shield

Shield 601 is placed on the drive assembly interface 502 of the robot arm 102. The robot arm seen in FIG. 6 is generally cylindrical with a circular cross section. The section 501 of the robot arm which attaches to the surgical instrument comprises a cut out configured to receive the surgical instrument such that the end portion 501a of the robot arm has a semi-cylindrical shape and a generally semi-circular cross section. In the longitudinal direction of the arm, the semi-cylindrical portion 501a of the arm therefore has one curved face and one planar face. The drive assembly interface 502 is located on the planar face of the end portion of the arm. Components of the drive assembly interface 502 such as drive assembly interface elements 505, 506, 507 engage the respective instrument interface elements at the planar face. The drive assembly interface elements may protrude from the planar face of the semi-circular portion of the arm. In other examples, the drive assembly interface elements may be set back from the planar face of the arm. The plane of the drive assembly interface 502 is coplanar with the planar face of the semi-circular portion of the arm 501a. FIG. 6 shows that the cylindrical portion of the arm 501b comprises a semi-circular shaped wall 604 at its end which is perpendicular to the plane of the drive assembly interface 502. The semi-circular wall 604 is visible when no instrument is attached to the arm. The receiver 503 is not shown in FIG. 6 but is positioned in the cylindrical portion of the robot arm, behind the wall 604. This is shown in FIG. 8. In this example, the receiver 503 is positioned close to but not in contact with the wall 604.

The shield has a planar shape and the plane of the shield is perpendicular to the longitudinal axis of the terminal ink of the robot arm. In the example shown, the shield is positioned on the drive assembly interface 502 such that the plane of the shield is perpendicular to the plane of the drive assembly interface. The plane of the shield is perpendicular to the planar face of the semi-cylindrical portion 501a of the arm. The shield is positioned proximally to the cylindrical portion 501b of the arm. The shield 601 is positioned abutting the semi-circular wall 604 of the robot arm. The plane of the shield is coplanar with the cross section of the robot arm.

FIG. 8 shows the interface between wall 604 and shield 601 in more detail. For clarity, the finger structure of shield 601 is not shown. The total area encompassed by the shield 601 including gaps between fingers is shown as area $A_S$. FIG. 8 shows that the semi-circular wall of the arm comprises a cavity 605 configured to receive the shield. In FIG. 8, the interior walls of the cavity are shown as dotted lines. The area of the plane of the cavity coplanar with wall 604 in this example is equal to the area encompassed by the shield, $A_S$. Receiver 503 is also shown in dotted lines. Receiver 503 is positioned behind the cavity 605. The area of the receiver in the same plane as the wall 604 and shield 601 is shown as $A_R$. In the example shown, the receiver is located adjacent to the back of the cavity 605. In this example, the plane of the shield 601 and the semi-circular wall 604 are coplanar. In other words, the shield is parallel to the semi-circular wall. The perpendicular distance between the shield 601 and receiver 503 is equal to l, as shown in FIG. 8.

In other examples, the robot arm may have a different shape, for example, the arm may have a square or rectangular cross section, however the relative locations of the shield and the receiver 503 will be the same.

The shield is configured to allow passage of the magnetic field originating from the transmitter 403 on the instrument through the shield but significantly attenuate passage of electric fields including any electric field originating from the instrument shaft. In the arrangement shown in FIG. 8, the area $A_S$ of shield 601 is greater than the area $A_R$ of the receiver 503. The area of the plane of the shield is greater than the area of the receiver in a parallel plane. The advantage of this design is that the shield prevents passage of a high proportion of electric fields which are approaching the receiver from the instrument. The shield attenuates the electric field originating from the instrument shaft, which would otherwise reach the RFID receiver.

As mentioned briefly above, currents and small magnetic fields are induced in the fingers of the shield. If the shield and receiver are positioned too close to one another, magnetic fields induced in the shield may be transferred to the receiver which can result in problems at the receiver on the robot arm. The magnetic field induced in the shield may have a similar frequency as RFID signals sent by the transmitter. As described above with respect to instruments and the receiver, capacitive coupling may also occur between the shield and the receiver. If the shield were to become coupled to the receiver, the receiver may become capacitively charged and enter a stuck state. When this happens, the instrument may not be recognised by the receiver on the arm. The instrument may therefore become inoperable, and the robotic surgical arm may require a restart. The shield is therefore positioned relative to the receiver so as to minimise capacitive coupling between the shield and the receiver.

The cavity 605 seen in FIG. 8 is largely empty such that an air space exists between the shield (located in line with the front of the cavity) and the receiver (located behind the cavity). The length of the air space i.e., the perpendicular distance between the receiver and the shield is l. The area occupied by the plane of the shield is shown as $A_S$. $A_S$ is the area occupied by the fingers including the space between them. The air space between the shield and the receiver has a volume equal to the volume of the cavity 605 minus the volume of the shield 601.

As shown in equation (1) below, the air space between the shield 601 and receiver 503 has the effect of reducing the capacitance between the shield and receiver, i.e., reducing coupling between the two components. The larger the distance l, the less capacitive coupling occurs between the shield and receiver. This helps to reduce the chance of interference between the shield and the receiver.

$$C = \frac{\varepsilon A_R}{l} \quad (1)$$

C is the capacitance between the shield and the receiver, ε is the relative permittivity of air, $A_R$ is the area of the receiver (i.e. the area of overlap between the shield and receiver) and l is the perpendicular distance between the shield and the receiver.

The distance between shield and receiver l seen in FIG. 8 is great enough that capacitance or permittivity between the shield 601 and receiver 503 is negligible or constant. In examples where the capacitance is constant, the receiver may be tuned as necessary to account for the constant capacitance.

Figure 9:
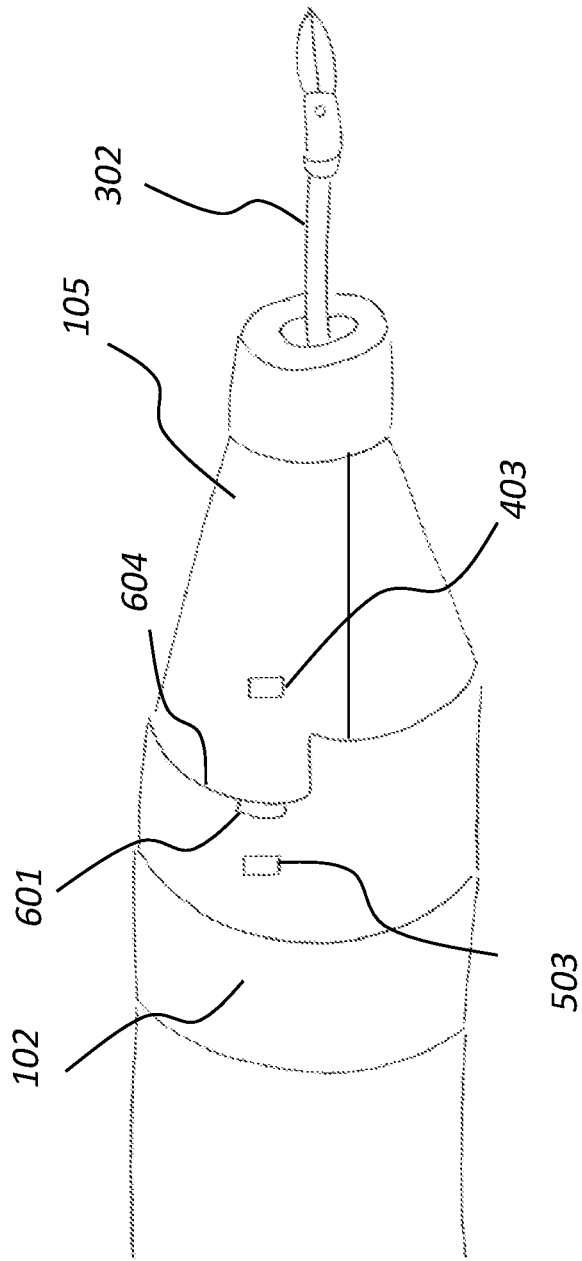
FIG. 9 shows an instrument attached to a robot arm, the robot arm comprising a shield

FIG. 9 shows an instrument 105 attached to the arm 102. The instrument interface 301 attaches to the drive assembly interface 502 of the robot arm (not shown) and the instrument 105 abuts the semi-circular wall 604 of the arm. The instrument interface elements 405, 406 and 407 engage respective drive assembly interface elements 505, 506 and 507 on the arm (not shown). FIG. 9 illustrates a traditional non-energised instrument, specifically a pair of scissors, but the instrument may be any non-energised or energised instrument.

When the instrument is attached the arm, the shield 601 is positioned generally between transmitter 403 on the instrument and receiver 503 on the arm. As explained above, the shield is configured to allow passage of radio frequency signals (i.e. the magnetic field originating from the transmitter on the instrument) through the shield but to attenuate electric fields, including those originating from the instrument shaft, by dissipating currents induced in the shield to ground. Thus, to reduce capacitive coupling between the instrument and the receiver, shield 601 can be placed anywhere between the instrument and the receiver. On an energised instrument such as monopolar scissors, the origin of the electric field is the shaft of the instrument through which a current is passed. Similarly, when a traditional instrument such as that shown in FIG. 9 undergoes capacitive coupling with an energised instrument, the shaft 302 of the traditional instrument is likely to become the origin of a separate electric field. Therefore, the shield can be positioned anywhere on the robot arm such that when an instrument engages the robot arm, the shield is located between the instrument shaft 302 and the receiver 503.

The shield 601 allows passage of radio-frequency signals through the shield so that they can be received at receiver 503 but causes attenuation of electric fields. In this application, the shield has a planar configuration and through the shield is taken to mean from one side of the plane to the other.

Figure 7:
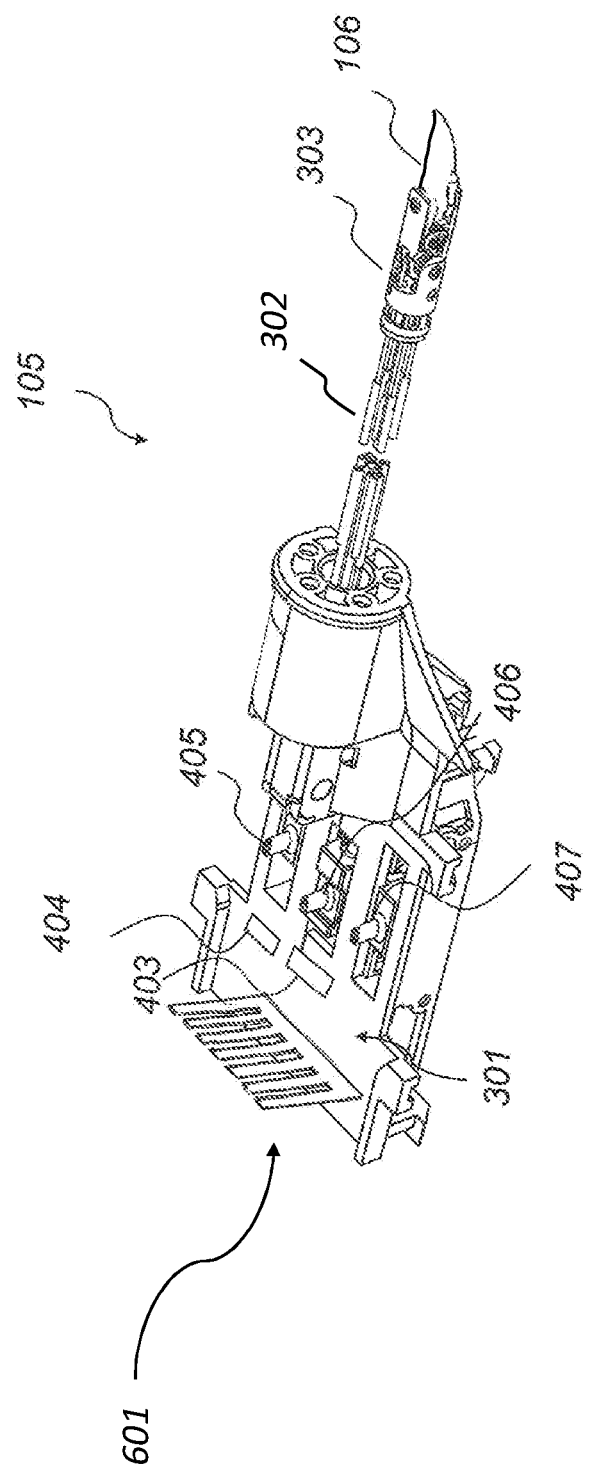
FIG. 7 shows an instrument comprising a shield

In the examples seen in FIGS. 6, 8 and 9, the shield is positioned on the drive assembly interface adjacent to the semi-circular wall 604. In other possible examples, the shield is positioned at other locations on the drive assembly interface. In some examples, the shield is positioned at other locations on the arm. In further examples such as that shown in FIG. 7, the shield is positioned on the instrument. The shield can be positioned anywhere on the instrument such that when the instrument engages with the robot arm, the shield is positioned between the instrument shaft 302 and the receiver 503. As shown in FIG. 7, the shield may be positioned on the instrument interface 301 but in other examples may be located elsewhere on the instrument. In the example seen in FIG. 7, the shield is positioned so as to protrude from the instrument interface. The shield shown has a planar shape and the plane of the shield is perpendicular to the plane of the instrument interface 301.

Figure 10:
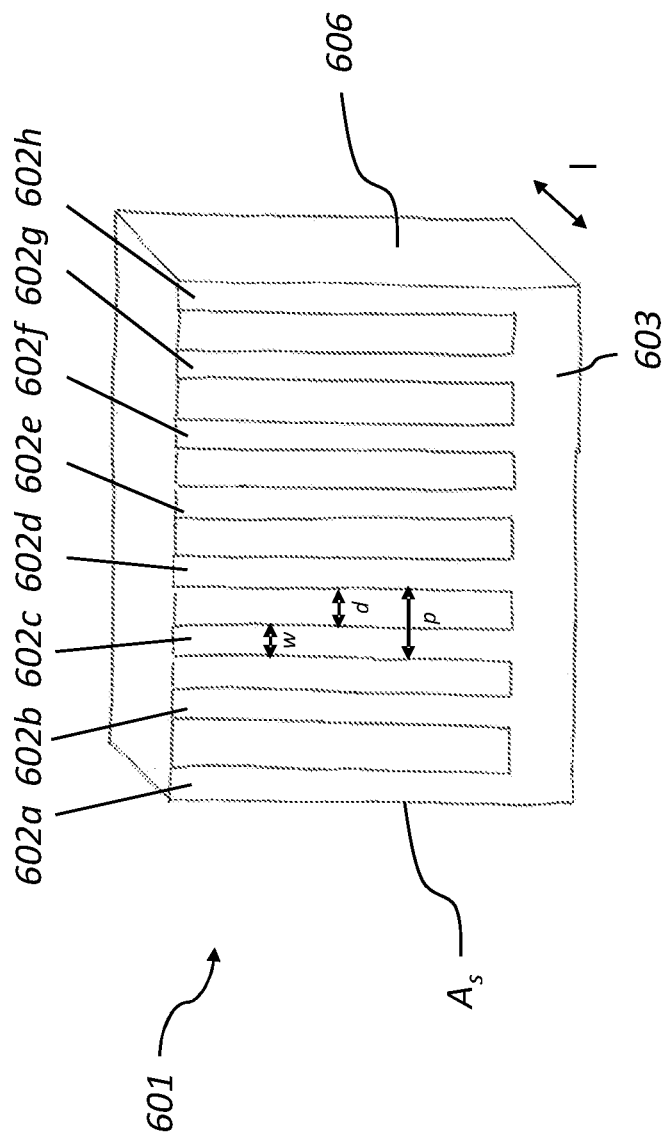
FIG. 10 shows a first example of a shield

In the arrangement illustrated in FIG. 6, shield 601 comprises a plurality of fingers 602 arranged in a row. The same shield is shown in more detail in FIG. 10. This exemplary shield comprises eight fingers, but in other examples the shield may comprise any number of fingers greater than four. FIG. 10 shows that each finger is elongate in shape and has a straight configuration. Each finger is parallel to all the other fingers in the row. The shield 601 also comprises a connector 603 which contacts each of fingers 602. In this example, the connector also has a straight configuration. The connector extends along the row of fingers in a direction perpendicular to the direction in which each finger extends. The connector contacts each finger at the same end of each respective finger. The fingers and connector may be composed of any non-ferrous material, for example for example aluminium, copper, lead, nickel, tin or zinc. In alternative examples, the shield may be composed of a ferrous material and the receiver is tuned as necessary to account for any polarisation of the shield.

In the example shown in FIG. 6 and in more detail in FIG. 8, an air space exists (in the cavity 605) between the fingers 602 of the shield 601 and the receiver 503. In some examples, the air space is filled with a foam, for example a low-density foam. The foam may be adhered to the fingers of the shield. In the example shown in FIG. 10, the shield comprises a foam element 606 which is adhered to the fingers 602. The plane of the fingers is parallel to the plane of the foam element. The area of the foam element is equal to the area of the plane of the shield A. The depth of the foam in this example is equal to the perpendicular distance between the shield and the receiver (l, seen in FIG. 8) such that the foam element fills the cavity 605. The volume of the foam element may be equal to the volume of the air space between the fingers of the shield 602 and the receiver 503 (seen in FIG. 8). In this example, the volume of the shield comprising fingers 602 and foam element 606 is equal to the volume of the cavity 605. In other examples, the volume of the foam element is less than the volume of the air space such that the volume between the shield and the receiver is comprised of air and foam. In further examples, the shield does not comprise a foam element but the arm itself comprises foam which, when the instrument is attached to the arm, is positioned between the shield and the receiver.

The foam of foam element 606 has a low dielectric constant, meaning that, as illustrated by equation (2) below, the capacitance between the shield 601 and receiver 503 remains low i.e., coupling between the two components is weak.

$$C = \frac{\varepsilon \varepsilon_F A_R}{l} \quad (2)$$

C is the capacitance between the shield and the receiver, $\varepsilon$ is the relative permittivity of air, $\varepsilon_F$ is the relative permittivity of foam, $A_R$ is the area of the receiver (i.e., the area of overlap between the shield and receiver) and l is the perpendicular distance between the shield and the receiver.

Foam has a higher dielectric constant than air, meaning that the capacitance C is slightly increased. However, using a foam element as a "spacer" between the shield and receiver means that during manufacture and use, the distance l between the components can be fixed. A shield comprising a foam element is therefore advantageous in that the distance between the shield and receiver can be maintained at its maximum value, having the effect of reducing capacitive coupling between the shield and the receiver. In other examples, the shield may comprise a row of fingers on a substrate of another material with a low dielectric constant, for example plastic or rubber.

The shield 601 seen in FIGS. 6 and 10 comprises straight fingers 602 joined by connector 603. Preferably, the shield includes rounding on internal corners so as to reduce mechanical strain on the shield. The fingers are composed of one or more non-ferrous materials. The connector is also formed of one or more non-ferrous materials so that the shield itself does not create a magnetic field around itself. For example, the fingers and connector may be composed of one or more of aluminium, copper, lead, nickel, tin and zinc. The fingers may be composed of the same material(s) as the connector. In other examples, the fingers and connector may be formed of different material(s). In some examples, connector 603 may be formed of copper tape.

The shield 601 is connected to ground. Specifically, connector 603 is connected to ground such that the shield 601 is not charged. In the example of FIG. 6, the connector 603 is connected to the local ground of the receiver 503 (not shown). As explained above, due to capacitive coupling between the shield and surgical instruments, small currents may be created in the fingers of the shield. Such currents are dissipated due to the shield's connection to ground.

The shield 601 comprises no closed loops so that no currents (which are not dissipated to ground) can form in the shield. No "loop" currents can be formed in the shield. Thus no currents in the shield can induce their own magnetic field in the shield. Any magnetic field induced in the shield would likely have a similar frequency to the radio-frequency communications being sent by the instrument and would interfere with the receiver receiving those signals. It is therefore desirable to minimise any such fields forming around the shield. None of the fingers 602 of shield 601 form any closed loops. None of the fingers form any closed loops with any of the other fingers or with the connector. "Loop" currents may also be created in individual fingers of the shield having a large enough area. The fingers of the shield are therefore small enough that no loop currents are formed in individual fingers. As the shield does not contain any closed loops, there are no paths for "loop" currents, and the shield does not retain a charge due to the grounded connection.

Because the shield is formed of non-ferrous materials, the shield itself does not create a magnetic field.

As above, any magnetic field induced in the shield would likely have a similar frequency to the radio-frequency communications being sent by the instrument transmitter and would interfere with the receiver receiving those signals. It is therefore desirable to reduce the chance of a magnetic field being created around the shield which would be strong enough to interfere with the receiver. In the shield shown in FIG. 10, each finger 602 has a width w equal to the width of all the other fingers. Fingers 602 are spaced equally across the width of the shield. In other words, the gap between a pair of fingers d is equal to the gap between all other pairs of fingers in the row of fingers. In other examples, the width of fingers w may vary for each finger. The width of a gap between a pair of fingers may be different to the width of a gap between any other pair of fingers. The gaps have a width d large enough such that capacitive coupling between adjacent fingers is minimised i.e., the gap d is large enough that the gap cannot be capacitively bridged so as close the circuit between two or more fingers. It may be preferable that the gap width d is greater than the finger width w.

Generally, it is desirable for the fingers to have a small width w. The advantage of this is that the chance of loop currents being induced in the finger is reduced. Also, any magnetic field induced around the fingers will be less likely to reach the receiver. Furthermore, when the fingers of the shield are fine, the shield appears more "transparent" to the magnetic field of the RFID signal.

It is also desirable for the gaps between teeth d to be small. Small gaps between teeth means that the electric field generated by the instrument penetrates less deep past the teeth and is less likely to reach and interfere with the receiver. The gaps between teeth are small enough that the shield reduces passage of the electric field originating from the instrument but not so small as to enable loop currents and large magnetic fields to be formed in the shield. The gap d may have a value of between 0.1 mm and 2 mm.

As explained previously, the distance between shield and receiver l seen in FIG. 8 is great enough that capacitance or permittivity between the shield 601 and receiver 503 is negligible or constant. The gap between teeth d should be less than distance l between the shield and the receiver. In one example, where the perpendicular distance between the shield and the receiver l is between 5 and 6 mm, it has found that an effective shield has fingers having a width w of no more than 1.2 mm.

In the arrangement shown in FIG. 8, the area $A_S$ of shield 601 is greater than the area of the receiver $A_R$ 503. The area of the plane of the shield is greater than the area of the receiver in a parallel plane. The advantage of this design is that the shield minimises passage of a high proportion of electric fields which are approaching the receiver. The shield therefore significantly attenuates any electric field originating from the instrument shaft, which would otherwise reach the RFID receiver. The area of the shield $A_S$ may be between 150% and 400% of the area of the receiver $A_R$.

In examples where the area of the transmitter 403 is greater than the area of the receiver 503, the area of the shield may be between 150% and 400% of the area of the transmitter.

According to one example where the area of the receiver $A_R=15$ mm$^2$, the area of the shield $A_S=25$ mm$^2$. The perpendicular distance between the shield and receiver l is 3 mm. The pitch p (shown in FIG. 10) is defined as the width of one finger and the width of the gap between the finger and an adjacent finger (p=w+d). In other words, the pitch is equal to the distance between one edge of a finger to the same edge of an adjacent finger. In examples of this scale, the pitch may fall anywhere within the range 0.1-2 mm. In this particular example, the pitch p=1 mm where d=0.4 mm and w=0.6 mm. In this example the ratio of finger width to gap width (w:d) is 6:4.

The ratio w:d may be between 6:4 and 2:8. Particularly in scenarios where the distance between the shield and the receiver is not large, the ratio 2:8 is preferred as capacitive coupling between adjacent fingers of the shield is reduced.

In another example, where the area of the shield is not greater than the area of the receiver but the distance between the shield and the receiver is greater than in the previous example, $A_R$=50 mm$^2$, $A_S$=25 mm$^2$ and the distance between the shield and receiver l is 6 mm. The pitch p=4 mm. In this example, the width of each finger w=0.8 mm. The width of the gap between each finger d=3.2 mm. In other examples, the pitch of the shield may fall anywhere between 0.1 and 10 mm.

Figure 11:
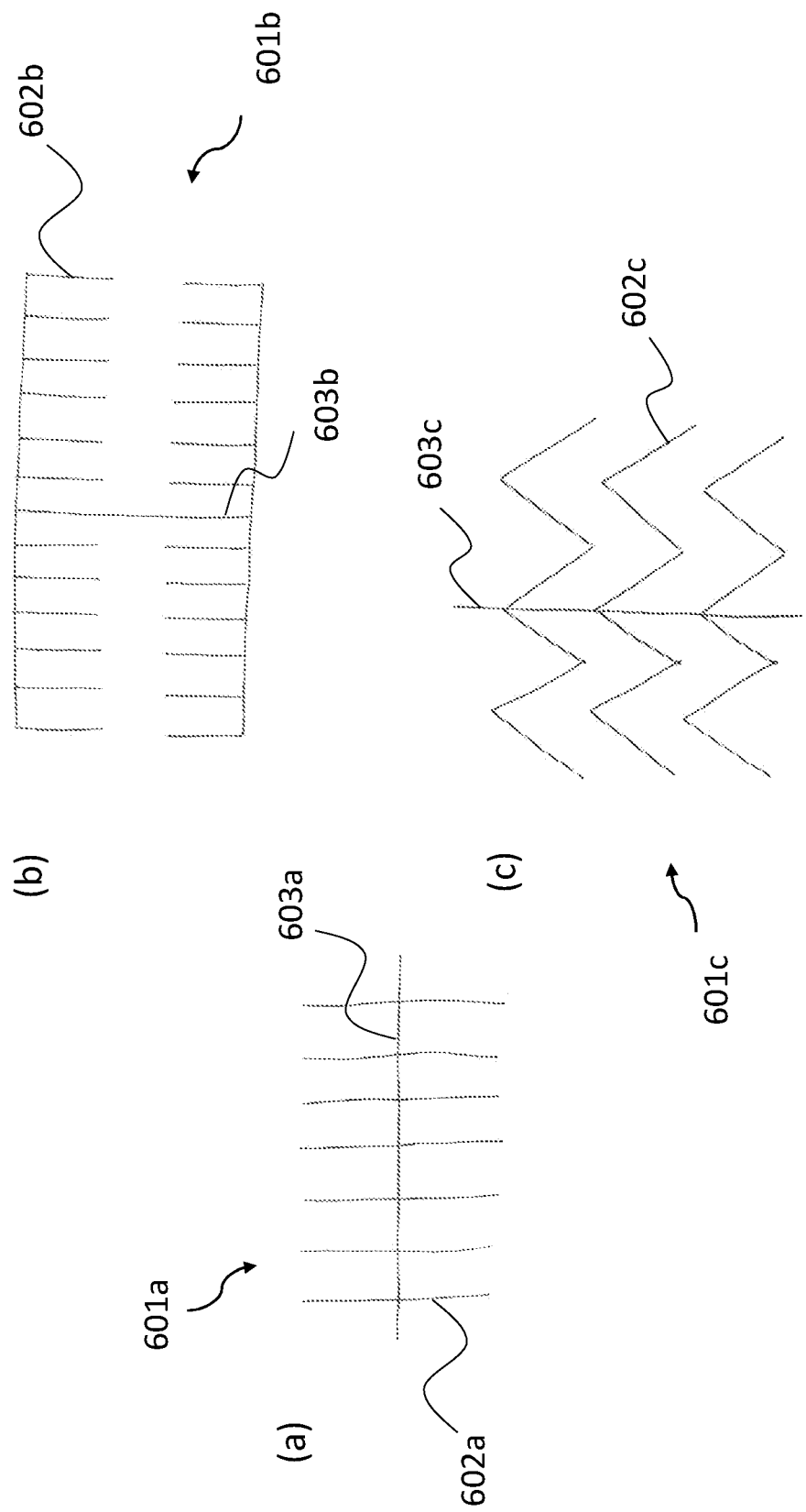
FIG. 11 shows further examples of shields
Figure 12:
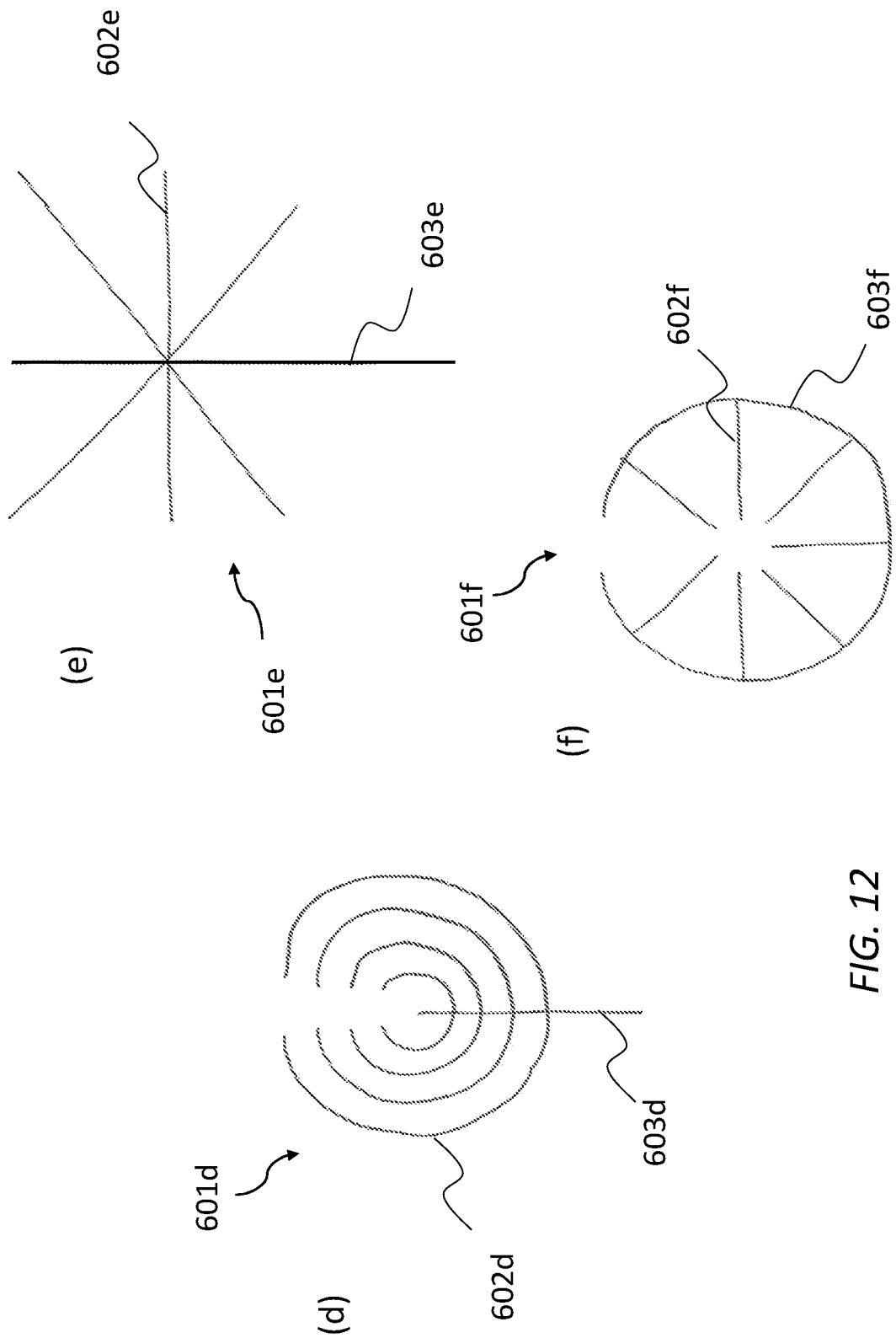
FIG. 12 shows further examples of shields

FIGS. 11 and 12 illustrate other shield designs. As per shield 601 previously described, each shield comprises fingers 602 and a connector 603. In FIGS. 11 and 12, the fingers and connector are represented by single lines and so the width of each finger and the connector is not shown. The dimensions of each finger and the gaps between each of the finger are within the ranges previously described.

The example shields shown in FIGS. 11, 601a, 601b and 601c each comprise fingers which are parallel to one another and evenly spaced. The number of fingers and the shape of each finger varies with each design. The relative positions of the fingers and the connector also vary. As per shield 601 already described, each shield comprises non-ferrous materials, contains no closed loops and during operation is connected to ground.

Shield 601a comprises a plurality of straight fingers arranged in a row. In the example shown, the shield comprises seven fingers. Instead of the connector 603 being positioned at the end of each of the fingers as previously described, in this example, the connector contacts each finger along the length of the finger in between its two ends. In the example shield 603a shown, the connector joins the centre of each finger to the centre of the adjacent finger and is perpendicular to each of the fingers 602a. In other words, the connector joins each finger halfway along the length of the respective finger. In other examples, the connector may contact each finger at any point along its length. The connector may be at any angle relative to the fingers.

Shield 601b comprises two rows of straight fingers 602b, each row having a plurality of fingers. In the example shown in FIG. 11, each row comprises twelve fingers. The two rows are arranged such that the fingers of one row are collinear with the fingers of the other row. The connector 603b has an "I" shape. For each row of fingers, each finger is connected to its adjacent fingers by a portion of connector 603b. For each row, connector 603b is positioned at one end of each of the fingers and is perpendicular to the fingers. On a first row, a first portion of connector 603b joins one end of the fingers of that row such that the fingers of the first row point towards the fingers of the second row. In the second row, a second portion of the connector 603b joins the opposite end of the fingers of that row such that the fingers of the second row point towards the fingers of the first row. In other words, both rows of fingers are positioned within the rectangular area encompassed by the "I"-shaped connector 603b. A third portion of the connector joins the first and second portions of the connector so as to join the two rows of fingers. The first and second portions of the connector are perpendicular to the fingers. The third portion is parallel to the fingers.

Shield 601c comprises a plurality of parallel fingers. The example shown in FIG. 11 illustrates a shield having three fingers. Each finger 602c has a "zig-zag" shape. In example shields such as this one, each finger covers a larger area than an equivalent finger having a straight configuration as previously described. Therefore, example shields comprising fingers which are not elongate and straight may comprise fewer fingers than shields comprising only straight fingers. For example, such shields may comprise fewer than four fingers. Connector 603c contacts each finger along the length of the finger in between its two ends. In the example shown, the connector 603c joins the centre of each finger to the centre of the adjacent finger. In other words, the connector joins each finger to an adjacent finger halfway along the length of the respective finger. Each finger, although having an alternating "zig-zag" shape extends generally in a first direction, where each finger extends in the same direction. The connector 603c extends in a perpendicular direction.

Shield 601d comprises a plurality of fingers. In the example shown in FIG. 12, the shield has four fingers. Each finger 602d has the configuration of a partial circle, i.e. each finger has the shape of a circle minus a gap in the circle. The gap in the circle of each finger has at least the same width as the width between adjacent fingers. The gap may have a width of between 0.1 mm and 2 mm. Each finger has a different effective radius from each of the other fingers such that the fingers are arranged concentrically. Each finger may be formed of a partial circle having a gap of equal size as each of the other fingers. In other examples, each finger may be formed of a partial circle including a gap of a different size to other fingers, for example each finger may have a gap of the same proportion relative to the radius of the partial circle formed by that finger (e.g. between $\pi r/10$ and $\pi r/6$). The gaps in the respective circles formed by each finger are positioned at the same angular position relative to each respective circle. In other words, the gaps in each finger line up with the gaps of each of the other fingers forming a larger space in the overall shape of the shield. Connector 603d has a straight configuration and connects adjacent fingers. Connector 603d is positioned radially with respect to the fingers 602d. In the example shown, the connector is positioned contacting each of the fingers at approximately halfway along the length of the respective finger. In other words, the connector is positioned opposite the gaps formed in the fingers 602d. In other examples, the connector may contact each finger closer to one of the respective finger's ends such that it is positioned more closely to the gaps of the fingers.

Shield 601e comprises a plurality of straight fingers arranged radially about a central point. The shield may comprise any number of fingers. The shield further comprises a connector also arranged radially with respect to the central point. The fingers and connector meet at the central point. There is a regular angular separation between adjacent fingers and between fingers adjacent to the connector and the connector. In other words, the angular spacing between adjacent fingers is the same for all pairs of adjacent fingers and is the same as the angular spacing between the connector and its adjacent fingers.

FIG. 12 shows an example in which the shield 601e comprises three fingers 602e and a connector 603e. Each finger has the same length. The fingers 602e cross halfway along their length. The connector 603e is also arranged radially with respect to the fingers. The connector has a length slightly longer than that of the fingers and also crosses over each of the fingers at the central point. In this example, a first finger is arranged perpendicularly with respect to the connector 603e. The second and third fingers are arranged perpendicularly with respect to one another. The second and third fingers are rotationally offset from the first finger and connector by 45 degrees. Thus in this example, the angular separation between adjacent fingers and between fingers adjacent to the connector is 45 degrees. The shield has an appearance similar to that of an eight-spoke asterisk. The width of the gap between each adjacent pair of fingers and between a finger and the connector is not constant along the length of the fingers as per the examples previously described. The gap between adjacent fingers and the gap between the connector and an adjacent finger decreases towards the centre of the shield. Thus, capacitive coupling between adjacent fingers and between the connector and an adjacent finger is stronger closer to the centre of the shield than towards the outer edges of the shield.

Shield 601f comprises a plurality of straight fingers 602f arranged radially. The shield may comprise any number of fingers. There may be regular angular separation between adjacent fingers. In other words, the angle between adjacent fingers may be the same for all pairs of adjacent fingers. In other examples, the angular separation between adjacent fingers may be equal for all but one pair of fingers. The shield further comprises a connector which has a partial circular shape and connects adjacent fingers at their outer edges such that the connector surrounds the plurality of fingers. In other words, the connector has the shape of a circle minus a gap in the circle. The angular separation between adjacent fingers located on either side of the gap may be different to the angular separation between all other pairs of adjacent fingers. In the example seen in FIG. 12, the angular separation between adjacent fingers located on either side of the gap is larger than the angular separation between all other pairs of adjacent fingers.

In the example seen in FIG. 12, the shield 601f comprises seven fingers. As described with reference to shield 601e, the width of the gap between each adjacent pair of fingers is not constant along the length of the fingers. The gap between adjacent fingers decreases towards the centre of the shield. Thus, capacitive coupling between adjacent fingers is stronger closer to the centre of the shield than towards the outer edges of the shield. Unlike the shield 601e, fingers 602f of shield 601f do not meet at a central point. In shield 601f, opposite fingers approach one another towards the centre of the shield but do not meet. The distance between approaching opposite fingers at the centre of the shield is equal to at least the smallest width between adjacent fingers (i.e. the distance between adjacent fingers towards the centre of the shield). In some examples, the smallest distance between opposite fingers is between 1 and 2 mm. In other examples, as a proportion of the length of each finger $l_f$, the distance between opposite fingers is between a sixth and a tenth of the length of each finger, i.e. 1/10 and 1/6. In shield 601f, connector 603f has a partial circular shape and connects adjacent fingers at their outer edges such that the connector surrounds the plurality of fingers. In other words, the connector has the shape of a circle minus a gap in the circle. The gap in the circle has at least the same width as the smallest width between adjacent fingers. According to one example, the gap in the connector may have a width of between 1 and 2 mm. In other examples the gap may have a width between $\pi r/10$ and $\pi r/6$, where r is the radius of the partial circle formed by the connector.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A robotic surgical arm comprising:
an interface configured to engage a robotic surgical instrument;
a receiver configured to receive wireless communications from the robotic surgical instrument; and
a shield comprising:
a plurality of fingers; and
a connector being in contact with each of the fingers,
wherein the shield is configured so that when the connector is electrically connected to ground, the shape, dimensions and arrangement of the fingers causes attenuation of the transmission of electric fields through the shield.

2. The robotic surgical arm of claim 1 wherein the shield is positioned so as to be between the robotic surgical instrument and the receiver when the robotic surgical instrument is engaged with the interface.

3. The robotic surgical arm of claim 1, wherein the shield is positioned on the interface.

4. The robotic surgical arm of preceding claim 1, wherein the arm comprises an air space between the fingers of the shield and the receiver, wherein the length of the air space is equal to the perpendicular distance between the fingers of the shield and the receiver.

5. The robotic surgical arm of claim 1, wherein the shield further comprises a foam element adhered to the fingers of the shield, the foam element having a length in the direction perpendicular to the plane of the shield equal to the length of the air space, the foam element positioned so as to occupy the air space between the fingers and the receiver.

6. The robotic surgical arm of claim 1, wherein the shield is planar.

7. The robotic surgical arm of claim 1, wherein the area of the shield is the area of the plane of the shield and the area of the shield is greater than the area of the receiver in a parallel plane.

8. The surgical robotic arm of claim 1, wherein the perpendicular distance between the fingers of the shield and the receiver is greater than the perpendicular distance between each pair of adjacent fingers in the shield.

9. The robotic surgical arm of claim 1, wherein the shield is configured to permit transmission of radio frequency signals and magnetic fields through the shield.

10. The robotic surgical arm of claim 1, wherein the fingers have a common shape and are arranged in a row, each finger is parallel to each of the other fingers in the row and for each finger, the sum of the width of the finger and the perpendicular distance between the finger and an adjacent finger is less than 4 millimetres.

11. The robotic surgical arm of claim 1, wherein the ratio of the width of each finger to the perpendicular distance between each pair of adjacent fingers is between 60:40 and 20:80.

12. The robotic surgical arm of claim 1, wherein each finger extends in a first direction and the connector extends in a second direction perpendicular to the first direction; and wherein each finger has a first end and a second end and the connector makes contact with each finger at its first end or at a point along the finger between the first and second ends.

13. The robotic surgical arm of claims of claim 1, wherein the shield comprises a first and a second row of fingers and first, second and third connectors, wherein the first connector makes contact with each finger in the first row of fingers, the second connector makes contact with each finger in the second row of fingers and the third connector makes contact with the first connector and the second connector.

14. The robotic surgical arm of claim 1, wherein each finger has the configuration of a partial circle having a radius, wherein the radius of the partial circle formed by each finger is different to the radius of the partial circle formed by every other finger, and the fingers are arranged concentrically with respect to one another.

15. The robotic surgical arm of claim 1, wherein each finger has a zig zag shape.

16. The robotic surgical arm of claim 1, wherein each finger has a straight configuration, the connector has a straight configuration, and each finger is arranged radially with respect to the other fingers and with respect to the connector.

17. The robotic surgical arm of claim 1, wherein the fingers are arranged radially and wherein, for each finger, the sum of the width of the finger and the smallest distance between the finger and an adjacent finger is less than 4 millimetres wherein the perpendicular distance between the fingers and the receiver is greater than the smallest distance between each pair of adjacent fingers in the shield, and wherein the connector has the configuration of a partial circle and contacts each finger so as to partially surround the plurality of fingers.

18. A robotic surgical instrument comprising:
an instrument interface configured to engage a robotic surgical arm;
a transmitter configured to transmit wireless communications to a receiver of the robotic surgical arm; and
a shield comprising:
a plurality of fingers; and
a connector being in contact with each of the fingers, wherein the shield is configured so that when the connector is electrically connected to ground, the shape, dimensions and arrangement of the fingers causes attenuation of the transmission of electric fields through the shield.

19. The robotic surgical instrument of claim 18 wherein the shield is positioned so as to be between a shaft of the robotic surgical instrument and the receiver of the robotic surgical arm when the robotic surgical arm is engaged with the interface.

20. The robotic surgical instrument of claim 18, wherein the shield is positioned on the instrument interface.

* * * * *